US012775464B2

(12) United States Patent
Freij et al.

(10) Patent No.: US 12,775,464 B2
(45) Date of Patent: Oct. 27, 2026

(54) LOAD FUSION

(71) Applicant: Advanced Micro Devices, Inc., Santa Clara, CA (US)

(72) Inventors: Alexander Toufic Freij, Santa Clara, CA (US); Matthew Raymond Poremba, Bellevue, WA (US); Gabriel H. Loh, Bellevue, WA (US); Onur Kayiran, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 70 days.

(21) Appl. No.: 18/392,187

(22) Filed: Dec. 21, 2023

(65) Prior Publication Data

US 2025/0208875 A1 Jun. 26, 2025

(51) Int. Cl.
*G06F 9/30* (2018.01)

(52) U.S. Cl.
CPC ...... *G06F 9/30181* (2013.01); *G06F 9/30043* (2013.01); *G06F 9/30101* (2013.01)

(58) Field of Classification Search
None
See application file for complete search history.

(56) References Cited

U.S. PATENT DOCUMENTS 6,446,190 B1 * 9/2002 Barry .................... G06F 9/3885 712/E9.023
6,463,525 B1 * 10/2002 Prabhu .................. G06F 9/3824 712/E9.046
10,514,922 B1 * 12/2019 Owens ................ G06F 9/30043
10,613,865 B2 * 4/2020 Barnes .................. G06F 9/3013
11,036,511 B2 * 6/2021 Shen ...................... G06F 9/3824
2003/0105793 A1 * 6/2003 Guttag ................ G06F 9/30145 712/E9.034
2004/0193848 A1 * 9/2004 Tavares ............... G06F 9/30036 712/E9.034
2008/0077771 A1 * 3/2008 Guttag ...................... G06F 7/53 712/E9.028
2013/0262841 A1 * 10/2013 Gschwind ............. G06F 9/3836 712/226

(Continued)

OTHER PUBLICATIONS

Intel 64 and IA-32 Architectures Software Developer's Manual, Jun. 2023, Intel (Year: 2023).*

(Continued)

*Primary Examiner* — Hyun Nam
(74) *Attorney, Agent, or Firm* — Volpe Koenig

(57) ABSTRACT

Devices, methods, and systems for load fusion. In an explicit approach, a first load operation and a second load operation, in a stream of operations, are replaced with a single load operation. One or more operations, configured to move and shift a value stored in a destination register of the single load operation, are inserted after the single load operation in the stream of operations. In an implicit approach, Information of a first load operation is inserted into a tracking table. Information of a second load operation is inserted into the tracking table responsive to an address of the second load operation being within a range. A load operation is executed from an address indicated by the first load operation and from an address indicated by the second load operation based on the tracking table.

16 Claims, 13 Drawing Sheets

(56) References Cited

U.S. PATENT DOCUMENTS

| | | | | |
|---|---|---|---|---|
| 2014/0122847 | A1* | 5/2014 | Henry | G06F 9/30145 712/243 |
| 2014/0189231 | A1* | 7/2014 | Maydan | G11C 21/00 711/110 |
| 2015/0100747 | A1* | 4/2015 | Kessler | G06F 3/0656 711/161 |
| 2016/0041827 | A1* | 2/2016 | Corbal | G06F 9/30036 712/205 |
| 2016/0328236 | A1* | 11/2016 | Kamatsuka | G06F 8/41 |
| 2017/0220353 | A1* | 8/2017 | Jackson | G06F 9/30134 |
| 2017/0249717 | A1* | 8/2017 | Meixner | G06T 1/20 |
| 2022/0050679 | A1* | 2/2022 | Lloyd | G06F 9/3853 |
| 2022/0391208 | A1* | 12/2022 | Levenstein | G06F 12/0895 |
| 2024/0411462 | A1* | 12/2024 | Ibrahim | G06F 15/7821 |
| 2025/0208875 | A1* | 6/2025 | Freij | G06F 9/30181 |

OTHER PUBLICATIONS

Baoni, V., et al.; "Fat Loads: Exploiting Locality Amongst Contemporaneous Load Operations to Optimize Cache Accesses"; MIRCO-21: 54th Annual IEEE/ACM Symposium on Microarchitecture, ACM, Oct. 2021, 14 pgs.

* cited by examiner

LOAD FUSION

BACKGROUND

In many modern processor architectures, data loads are performance bottlenecks. For example, in a central processing unit (CPU) that can service multiple outstanding load requests per cycle from the data cache, some of these loads may fetch smaller data sizes than the respective scalar and vector register widths available, e.g., due to variable data sizes. For example, for a CPU with 256-bit wide vector registers, 32-bit, 64-bit, and/or 128-bit loads may result in load requests that do not fully utilize available load/store throughput and bandwidth.

BRIEF DESCRIPTION OF THE DRAWINGS

A more detailed understanding can be had from the following description, given by way of example in conjunction with the accompanying drawings wherein.

DETAILED DESCRIPTION

Figure 1:
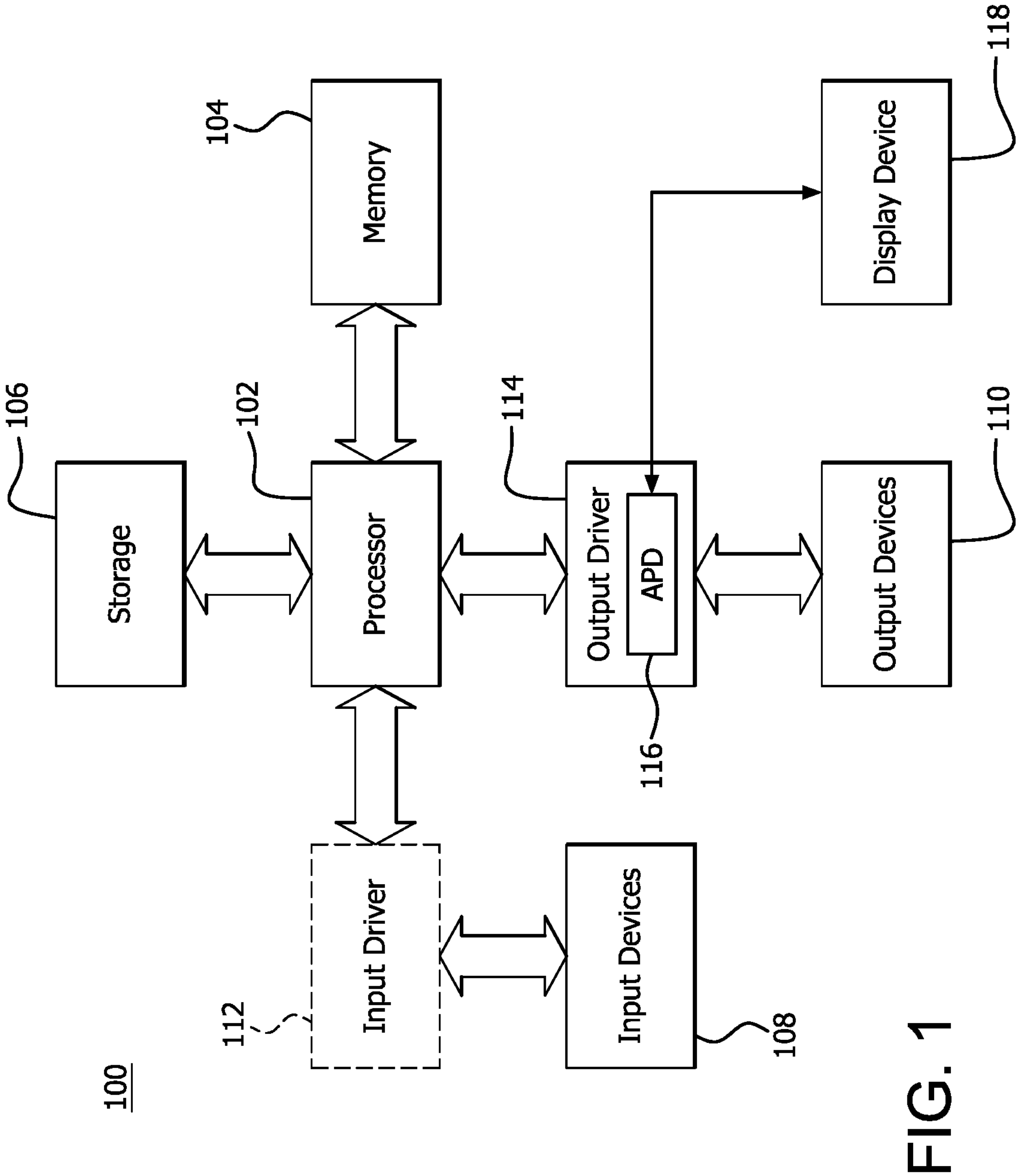
FIG. 1 is a block diagram of an example device in which one or more features of the disclosure can be implemented.

Modern processors have separate instruction and/or pop schedulers and execution lanes for vector and scalar instructions and/or pops. In some implementations, these execution lanes include dedicated and limited address generation units (AGU) which generate addresses and issue data load requests from the cache. To better utilize the AGUs and reduce the performance bottleneck of requesting cached data, in some implementations, a load fusion mechanism detects two or multiple loads of the same type (can be vector or scalar) to consecutive memory locations and fuses them into a single load, or fewer loads, respectively. In this context, fusing refers to replacing a plurality of loads with a single load, e.g., of a different size. In some implementations, this approach reduces load/store unit (LSU) utilization, which in some cases has the advantage of providing a speedup when the LSU is the bottleneck of the workload.

Some implementations provide a processor configured for load fusion. The processor includes circuitry configured to replace a first load operation and a second load operation, in a stream of operations, with a single load operation. The processor also includes circuitry configured to insert one or more operations, configured to move and shift a value stored in a destination register of the single load operation, after the single load operation in the stream of operations.

In some implementations, the stream of operations comprises a stream of instructions, or a stream of pops. In some implementations, the one or more operations configured to move and shift the value stored in the destination register of the single load operation comprises a single operation configured to move and shift the value stored in the destination register of the single load operation. In some implementations, the one or more operations configured to move and shift the value stored in the destination register of the single load operation comprises a first operation configured to move the value stored in the destination register of the single load operation and a second operation configured to shift the value stored in the destination register of the single load operation. In some implementations, a size of a data load indicated by the single load operation is less than, or equal in size to, a sum of a data load indicated the first load operation and of a data load indicated the second load operation. In some implementations, the first load operation loads data of a size smaller than a width of a destination register of the first load operation, and the second load operation loads data of a size smaller than a width of a destination register of the second load operation. In some implementations, replacing the first load operation and the second load operation comprises replacing the first load operation with the single load operation and either replacing the second load operation with a null operation (nop) or eliminating the second load operation. In some implementations, the one or more operations configured to move and shift the value stored in the destination register of the single load operation comprise a register move operation that copies data from a destination register of the first load operation to a second register. In some implementations, the one or more operations configured to move and shift the value stored in the destination register of the single load operation comprise a register shift operation that shifts bits of the second register. In some implementations, the one or more operations configured to move and shift the value stored in the destination register of the single load operation comprise a register shift operation that shifts bits of the second register by a number of bits which aligns data corresponding to the second load operation.

Some implementations provide a method for load fusion. A first load operation and a second load operation, in a stream of operations, are replaced with a single load operation. One or more operations, configured to move and shift a value stored in a destination register of the single load operation, are inserted after the single load operation in the stream of operations. In some implementations, the stream of operations comprises a stream of instructions, or a stream of pops.

In some implementations, the one or more operations configured to move and shift the value stored in the destination register of the single load operation comprises a single operation configured to move and shift the value stored in the destination register of the single load operation. In some implementations, the one or more operations configured to move and shift the value stored in the destination register of the single load operation comprises a first operation configured to move the value stored in the destination register of the single load operation and a second operation configured to shift the value stored in the destination register of the single load operation. In some implementations, a size of a data load indicated by the single load operation is less than, or equal in size to, a sum of a data load indicated the first load operation and of a data load indicated the second load operation. In some implementations, the first load operation loads data of a size smaller than a width of a destination register of the first load operation, and the second load operation loads data of a size smaller than a width of a destination register of the second load operation. In some implementations, replacing the first load operation and the second load operation comprises replacing the first load operation with the single load operation and either replacing the second load operation with a null operation (nop) or eliminating the second load operation. In some implementations, the one or more operations configured to move and shift the value stored in the destination register of the single load operation comprise a register move operation that copies data from a destination register of the first load operation to a second register. In some implementations, the one or more operations configured to move and shift the value stored in the destination register of the single load operation comprise a register shift operation that shifts bits of the second register. In some implementations, the one or more operations configured to move and shift the value stored in the destination register of the single load operation comprise a register shift operation that shifts bits of the second register by a number of bits which aligns data corresponding to the second load operation.

Some implementations include a processor configured for load fusion. The processor includes circuitry configured to insert information of a first load operation into a tracking table. The processor also includes circuitry configured to insert information of a second load operation into the tracking table responsive to an address of the second load operation being within a range. The processor also includes circuitry configured to execute a load operation from an address indicated by the first load operation and from an address indicated by the second load operation based on the tracking table.

In some implementations, the first load operation and the second load operation are executed by different address generation units of an execution unit (EX). In some implementations, the load from the address indicated by the first load operation the load from the address indicated by the second load operation are queued in a same entry of a LQ. In some implementations, the load from the address indicated by the first load operation and the load from the address indicated by the second load operation are queued in a same entry of a LQ, at an offset. Some implementations include circuitry configured to route the load from the address indicated by the first load operation and the load from the address indicated by the second load operation from the LQ to different architectural registers. Some implementations include circuitry configured to route the load from the address indicated by the first load operation and the load from the address indicated by the second load operation from subsets of the entry of the LQ to different architectural registers.

Some implementations include a method for load fusion. Information of a first load operation is inserted into a tracking table. Information of a second load operation is inserted into the tracking table responsive to an address of the second load operation being within a range. A load operation is executed from an address indicated by the first load operation and from an address indicated by the second load operation based on the tracking table.

In some implementations, the first load operation and the second load operation are executed by different address generation units of an EX. In some implementations, the load from the address indicated by the first load operation the load from the address indicated by the second load operation are queued in a same entry of a LQ. In some implementations, the load from the address indicated by the first load operation and the load from the address indicated by the second load operation are queued in a same entry of a LQ, at an offset. Some implementations include circuitry configured to route the load from the address indicated by the first load operation and the load from the address indicated by the second load operation from the LQ to different architectural registers. Some implementations include circuitry configured to route the load from the address indicated by the first load operation and the load from the address indicated by the second load operation from subsets of the entry of the LQ to different architectural registers.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or Display Port compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm can also perform the functionality described herein.

During operation of a typical processor, such as a CPU, multiple load instructions (or micro-operations (pops), depending on the architecture) may be issued to read from contiguous addresses in memory. For example, the pseudocode of Table 1 illustrates example vector load request instructions issued to contiguous addresses in memory:

TABLE 1

```
// Two contiguous 128b loads into vector registers (ymm):
vmovdq (%rdx,%rax,8), %ymm6
vmovdq 16(%rdx,%rax,8), %ymm7
```

Although the examples presented herein are discussed with respect to load instructions, it is noted that in some implementations, the same or similar techniques are applicable to load pops. For example, in some complex instruction set (CISC) architectures, instructions may be decoded and converted into micro-operations (pops) that are passed through CPU pipelines. In some reduced instructions set (RISC) architectures, instructions may not be converted into pops but may be decoded and passed through subsequent stages of the CPU pipeline.

In this example, vmovdq ("vector move double quad") is a vector instruction indicating a double quad word width load instruction. In this example, the scale of the argument % rax is indicated as 8, however this is example context, and any suitable scaling (or no scaling) of the index register % rax is possible in other examples. Since the instruction is of double quad width, the width of the loaded value is 128 bits. In Table 1, the first vmovdq instruction loads 128 bits from memory at the address indicated by base register % rdx and index register % rax to the architectural register % ymm6. The second vmovdq instruction loads 128 bits from an address indicated by base register % rdx and index register % rax, offset by 16 bytes (128 bits), to the architectural register % ymm7. It is noted that architectural registers % ymm6 and % ymm7 are each 256 bits wide in this example. It is also noted that the instructions, instruction formats, data, and so forth in all example pseudocode herein are only exemplary, and any suitable instructions, formats, data, and so forth are usable in other implementations. It is also noted that pseudocode herein uses 64-bit x86 register set nomenclature, however any other register set or instruction set architecture is usable in other implementations. As used herein, an architectural register is a register name or label defined by the ISA that can be referenced directly by software (e.g., user applications, compilers, etc.) that is used to enable microarchitectural optimizations such as register renaming, and a physical register is a physical hardware element that stores the data values and execution results used in the CPU pipeline.

The only difference between the two load request instructions shown in Table 1 is the offset of the requested word and the destination architectural register. After both instructions are executed, two 256-bit architectural registers (% ymm6 and % ymm7) will each be partially occupied (each by 128 bits).

Similarly, the pseudocode of Table 2 illustrates example scalar load requests issued to contiguous addresses in memory (scalar load requests can also be referred to as integer load requests):

TABLE 2

```
// Two contiguous 32-bit loads into general purpose registers (GPRs):
  movd (%rdx,%rax,8), %r15
  movd 4(%rdx,%rax,8), %r16
```

In this example, movd ("move double") is a scalar instruction indicating a double word width load instruction. In this example, the scale of the loaded value is indicated as 8, however this is example context, and any suitable scaling (or no scaling) of the index register % rax is possible in other examples. Since the instruction is a double width, the width of the loaded value is 32 bits. In Table 2, the first movd instruction loads 32 bits from memory at the address indicated by base register % rdx and index register % rax to the architectural register % r15. The second movd instruction loads 32 bits from an address indicated by base register % rdx and index register % rax, offset by 4 bytes (32 bits) to the architectural register % r16. It is noted that architectural registers % r15 and % r16 are each 64 bits wide in this example The only difference between the two load request instructions shown in Table 2 is the offset of the requested word and the destination architectural register. After both instructions are executed, two 64-bit physical registers corresponding to architectural registers % r15 and % r16 will each be partially occupied (each by 32 bits).

In both the vector example of Table 1, and the scalar example of Table 2, occupying two physical registers reduces the number of effective physical registers available in the physical register file (PRF). Further, this also utilizes additional address generation units (AGUs) and load store units (LSUs) as compared with a single load instruction and/or pop.

In some cases, unnecessary load instructions and/or pops (and consequent additional utilization of the subsystems used for the load instructions) prevent or impair additional performance boosts, e.g., in memory-intensive applications where memory reads are frequently used. Accordingly, it may be desired to provide load fusion mechanisms to reduce the total effective number of loads (i.e., number of loads executed by a processor regardless of the number of corresponding loads specified in software). Some implementations may be configured to determine whether memory reads are frequent enough to warrant employment of the load fusion mechanisms.

Some solutions exploit spatiotemporal memory accesses to fetch full cache lines (e.g., 64-byte cache lines) into dedicated on-chip buffers, and employ a predictive mechanism to determine if a cache line is accessed frequently enough to be fetched into a dedicated cache line access register. However, in some implementations this incurs significant additional hardware to implement buffers and access prediction hardware. Accordingly, it may be desired to provide instruction and/or pop fusion such as described herein. In some implementations, such instruction and/or pop fusion has the advantage of providing a straightforward mechanism for efficient data loads.

Some solutions exploit a compiler-based approach to attempt to optimize source code to reduce the number of issued loads by merging them. In certain situations, such as when a load address is dynamically generated and not known at compile time, compilers do not attempt to optimize the load instructions and instead leave them in their original state. Furthermore, in some cases, compilers provide only a static analysis of source code and are not aware of the LSU utilization over the duration of the workload. Accordingly, it may be desired to provide instruction and/or pop fusion such as described herein. In some implementations, such instruction and/or pop fusion has the advantage of detecting high utilization and adjusting dynamically to begin fusing loads to reduce the LSU pressure.

Some implementations fuse loads and track the corresponding registers for dependency information to be propagated to younger dependent instructions and/or pops. In some implementations, hardware structures and modifications to current hardware are provided. Some implementations include dynamically altering the instructions and/or pops (e.g., dynamically adjusting the instruction and/or pop stream) to explicitly issue a fused load. Some implementations include a transparent microarchitectural approach.

In some implementations where the instructions and/or pops (e.g., instruction and/or pop stream) is altered to issue a fused load, the instructions and/or pops (e.g., instruction and/or pop stream) are dynamically altered to fuse multiple loads and add additional instructions (e.g., move and/or shift instructions) to write values to the correct registers (i.e., to provide the same output that would have resulted from execution of the original instruction stream). This may be referred to as "explicit instruction fusion".

Table 3 shows an example code modification which fuses two 32b loads into one 64b load, and adds further instructions to provide the same output that would have resulted from execution of the original instructions.

TABLE 3

```
// original instruction stream:
movd (%rdx,%rax,8), %r15d
movd 4(%rdx,%rax,8), %r16d
// modified instruction stream:
movq (%rdx,%rax,8), %r15
mov %r15, %r16
shr %r16, 32
```

Here, the original instructions include two scalar double-word load (movd) instructions which each load 32 bits. The first movd instruction loads 32 bits from memory at addresses indicated by registers % rdx and % rax to the register file % r15d (i.e., the least significant 32 bits of register r15). The second movd instruction loads 32 bits from the same addresses indicated by rdx and rax, but offset by 4 bytes (32 bits), to the register % r16d (i.e., the least significant 32 bits of register r16).

As discussed earlier, this requires two separate load instructions, which may cause performance issues in some cases (e.g., where performance is memory constrained). Accordingly, in order to accomplish the loading of the 64 bits by a single instruction, in some implementations, the two movd instructions are replaced by a single scalar quad-word load (movq) instruction, which loads 64 bits from the addresses indicated by rdx and rax, to a single register r15 (i.e., the entire 64 bits of register r15). In order to replicate the output of the original instruction stream, the entire 64 bits are copied from r15 to r16 (within the register file), e.g., using a load (mov) instruction mov r15, r16, and the contents of register r16 are shifted by 32 bits, e.g., using a shift register (shr) instruction shr r16, 32, in order to replicate the offset loading of the second movd instruction in the original instruction stream. This example assumes that the upper 32 bits of r15 are not used by any subsequent instructions (otherwise the upper 32 bits would also have to be zeroed out for full equivalence).

In this example, the two loads (movd) have been fused into a single load instruction (movq) followed by a register move and shift. In some implementations, this approach has the advantage of not consuming additional registers, and of reusing the original load destination registers. In some implementations, this preserves any true dependencies in the original source code. In this example, the register move and shift move the upper 32 bits of r15 to the lower 32 bits of r16.

In some implementations, more than two loads are fused into a single load instruction. Table 4 shows an example code modification which fuses four 32b loads into one 64b load, and adds further instructions to provide the same output that would have resulted from execution of the original instructions. In the example of Table 4, each load in the original, pre-modified instruction stream is replaced by one move and one shift with a modified immediate:

TABLE 4

```
// original instruction stream:
// (each mov loads 16bits from (%rdx,%rax,8) to the destination register)
mov (%rdx,%rax,8), %r8
mov 2(%rdx,%rax,8), %r9
mov 4(%rdx,%rax,8), %r10
mov 6(%rdx,%rax,8), %r11
// modified instruction stream:
movq (%rdx,%rax,8), %r8          // load 64bit value into r8
mov %r8, %r9                     // move r8 to r9
shr %r9, 16                      // shift r9 by 16
mov %r8, %r10                    // move r8 to r10
shr %r10, 32                     // shift r10 by 32
mov %r8, %r11                    // move r8 to r11
shr %r11, 48                     // shift r11 by 48
```

In the example of Table 4, the updated instruction stream loads the 64b value into % r8 once, and moves the value from % r8 into each destination register, shifting by an appropriate number of bits to yield the same output as the original instruction stream.

The example of Table 4 shows a scalar example. It is noted that a similar approach is applicable to vector loads. For example, when fusing four 128b vector loads into one 512b vector load, each register would be shifted by 128b, 256b, and 384b, respectively.

Table 5 shows another example code modification which fuses four 32b loads into one 64b load, and adds further instructions to provide the same output that would have resulted from execution of the original instructions. In the example of Table 5, each load in the original, pre-modified instruction stream is replaced by one move and one shift with a similar immediate:

TABLE 5

```
// original instruction stream:
// (each mov loads 16 bits from (%rdx,%rax,8) to the destination register)
mov (%rdx,%rax,8), %r8
mov 2(%rdx,%rax,8), %r9
mov 4(%rdx,%rax,8), %r10
mov 6(%rdx,%rax,8), %r11
// modified instruction stream
movq (%rdx,%rax,8), %r8          // load 64bit value into r8
mov %r8, %r9                     // move r8 to r9
shr %r9, 16                      // shift r9 by 16
mov %r9, %r10                    // move r9 to r10
shr %r10, 16                     // shift r10 by 32
mov %r10, %r11                   // move r10 to r11
shr %r11, 16                     // shift r11 by 48
```

In the example of Table 5, the updated instruction stream loads the 64b value into % r8 once, and moves the value from % r8 into the first destination register, shifting by an appropriate number of bits, moves the value from the first destination register to the second destination register, shifting by an appropriate number of bits, and so forth, to yield the same output as the original instruction stream.

Table 5 shows a scalar example. It is noted that a similar approach is applicable to vector loads, as with Table 4.

In some implementations, the instruction stream would need to be dynamically modified within the pipeline. Accordingly, some implementations include hardware modifications within the decode stage of the pipeline. For example, the instruction cache (IC) and op cache (OC) are accessed prior to the decode stage; accordingly, in some implementations, e.g., to ensure that the instruction stream is correctly modified, an additional bypass is added from the rename stage to the IC and OC to fetch, from the op cache, the ops used to modify the instruction stream.

In some implementations, circuitry configured to perform checks on the bounds of load fusion candidates' addresses is also provided in the decode and/or rename stage. For example, in some implementations, circuitry is provided to confirm that the total size of the memory fetched by the load instructions proposed for fusion are not larger than the maximum size of the destination register (e.g., 64 bits for scalar loads, or 512 bits for vector loads in the examples herein), or otherwise to ensure that if a memory fetch is larger than the maximum size of the destination register, the loads are not fused.

In order to determine whether two load instructions and/or pops can be replaced or "fused" in this way, in some implementations, information about loads in an instruction and/or pop stream or other collection of instructions and/or pops is collected. Such information is collected in any suitable manner, such as by storing in a table or other data structure. In some implementations, the information is stored in a dedicated buffer or other device.

For example, load instruction and/or pop s that are candidates for load fusion (e.g., load instruction and/or pops that are below the maximum size of the respective destination register) may not all arrive in the rename stage within the same clock cycle. Accordingly, some implementations include circuitry configured to track and fuse loads across different instruction bundles, where instructions bundles are instructions that are decoded in the same clock cycle.

This may be done in any suitable way. For example, in some implementations, to support fusing loads from different instruction bundles, a table is used to track the candidate loads or information about the candidate loads. Such a table is referred to herein as a Fused Load Tracking Table (FLTT). In some implementations, the FLTT is a hardware structure. In some implementations, the FLTT indicates the logical destination registers from the original instruction stream and the physical register assigned to the first decoded/renamed load (e.g., in a buffer). In some implementations, the table resides, in a logical sense, between rename stages (e.g., by adding an additional rename stage), or within one of the rename stages, of the CPU pipeline. In some implementations, this facilitates population of the FLTT as load addresses and register destinations are available, and allows the instruction stream to be modified before dispatching to the necessary instruction and/or pop queue.

Figure 9:
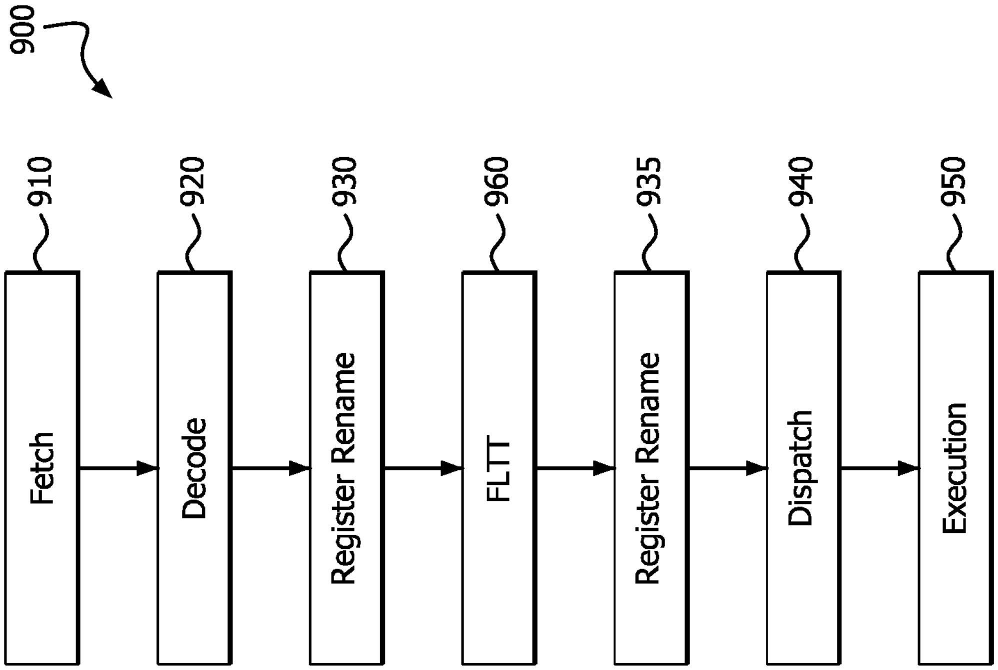
FIG. 9 is a block diagram illustrating an example CPU pipeline including an FLTT.
Figure 10:
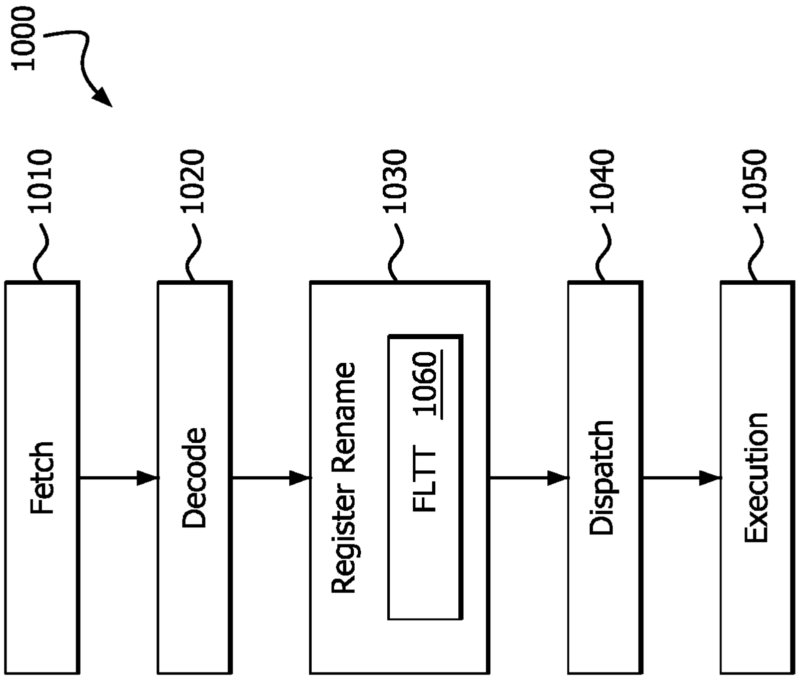
FIG. 10 is a block diagram illustrating an example CPU pipeline including another FLTT.

FIG. 9 is a block diagram illustrating an example CPU pipeline 900, which shows an example location of an FLTT within the pipeline. CPU pipeline 900 includes fetch stage 910, decode stage 920, register rename stage 930, register rename stage 935, dispatch stage 940, and execution stage 950. In this example, FLTT 960 resides between register rename stage 930 and register rename stage 935. FIG. 10 is a block diagram illustrating an example CPU pipeline 1000, which shows another example location of an FLTT within the pipeline. CPU pipeline 1000 includes fetch stage 1010, decode stage 1020, register rename stage 1030, dispatch stage 1040, and execution stage 1050. In this example, FLTT 1060 resides within register rename stage 1030. It is noted that the position of the FLTT in FIGS. 9 and 10 is illustrative, and the FLTT is located in other parts of the pipeline in other implementations, e.g., as discussed herein. It is also noted that the pipelines shown and described with respect to FIGS. 9 and 10 are illustrative, and in some implementations the pipeline includes additional stages, different stages, fewer stages, and/or a subset of the stages shown.

Figure 2:
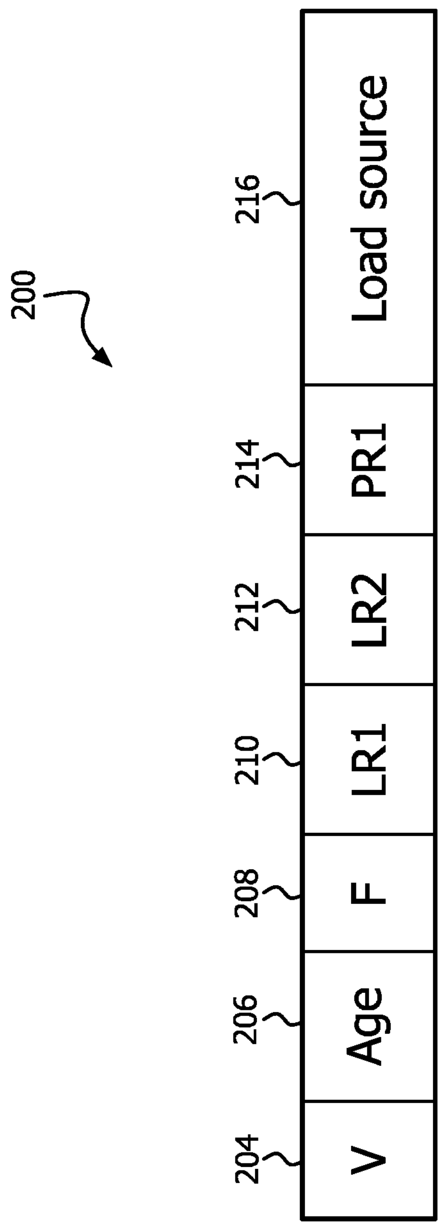
FIG. 2 is a block diagram illustrating an example format for a fused load tracking table (FLTT) entry which may be implemented by hardware as shown and described with respect to FIG. 1.

FIG. 2 is a block diagram illustrating an example format for a FLTT entry 200. In this example, entry 200 supports fusing a maximum of two loads, and includes valid (V) field 204, age field 206, fused (F) field 208, logical register 1 (LR1) field 210, logical register 2 (LR2) field 212, physical register 1 (PR1) field 214, and load source field 216.

V field 204 indicates whether entry 200 is valid, and is set to indicate that entry 200 is valid when a new entry is created (e.g., when a load instruction is detected in the rename stage). The valid bit is set to indicate that entry 200 is invalid if the fused load has been fetched from memory and marked complete as indicated by a signal from the respective load queue (LQ) entry, or if age field 206 has saturated (e.g., reached a maximum, or threshold value) and the F field 208 does not indicate that the load instruction has been fused (i.e., indicates that further loads have not been detected to fuse with this load.)

In some implementations, V field 204 includes a single bit that is set to indicate validity, and cleared to indicate invalidity, however, any suitable implementation of the V field 204 is usable in other implementations.

Age field 206 is used to invalidate unfused entries after a period of time (e.g., after a threshold number of cycles), as described above, to allow later loads to be fused instead.

F field 208 indicates whether the entry represents a fused load. In some implementations, F field 208 includes a single bit that is set to indicate that the entry represents a fused load, and cleared to indicate that the entry represents a load that is not fused, however, any suitable implementation of the F field 208 is usable in other implementations.

LR1 field 210 indicates the logical register to which a candidate load instruction stores its loaded information, and LR2 field 212 indicates the logical register to which a second candidate load instruction stores its loaded information. It is noted that some implementations include additional LR fields (e.g., in order to fuse more than two load instructions).

PR1 field 214, indicates the physical register to which the fused load instruction, or the first load instruction, was renamed in the same decode bundle or past decode bundle, respectively.

Load source field 216 indicates the register indicating the address, or base address, from which the fused load instruction, or the first load instruction, loads its information.

In some implementations, the load source field 216 is used for future loads to check if they are fetching data within a bound of this entry's load (e.g., an 8 byte or 64 byte bound for scalar or vector loads, respectively) allowing the loads to be fused.

It is noted that in some implementations a FLTT entry includes additional fields (e.g., additional LR fields to track further load candidates in order to fuse more than two loads), or includes fewer than, or a subset of these fields (e.g., where the information is tracked in other ways, or is not tracked).

Figure 3:
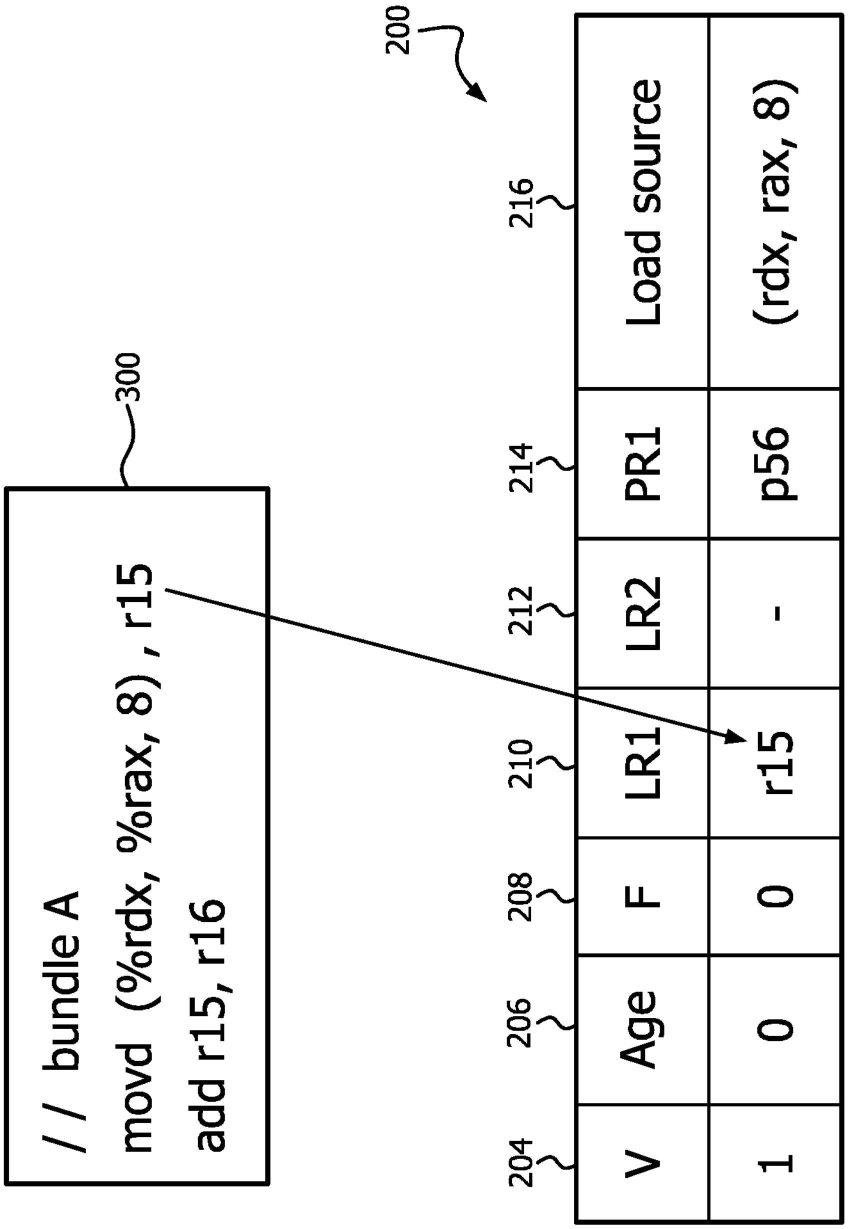
FIG. 3 is a block diagram illustrating an example population of the FLTT shown and described with respect to FIG. 2, by a first instruction bundle.
Figure 4:
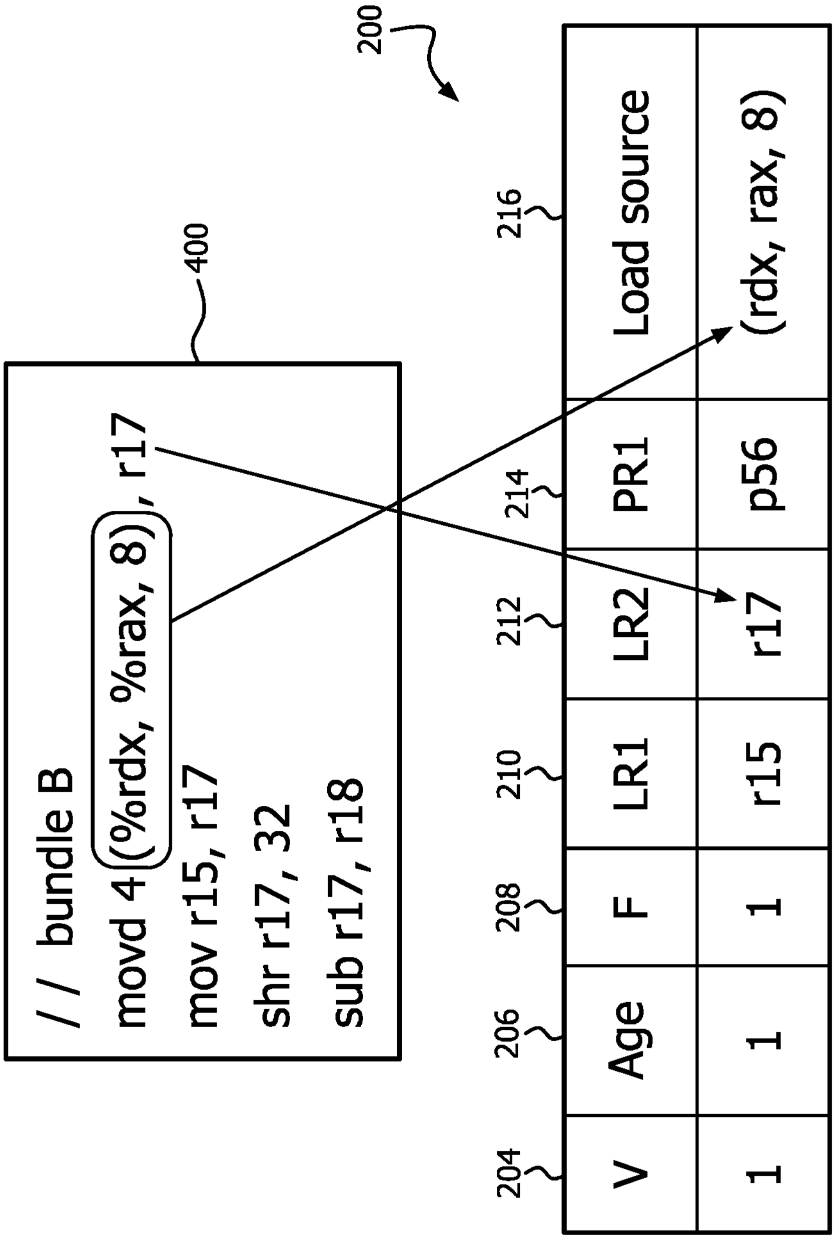
FIG. 4 is a block diagram illustrating an example population of the FLTT shown and described with respect to FIG. 2, by a second instruction bundle.

FIGS. 3 and 4 illustrate population of an example FLTT entry across two decode bundles. In some implementations, if load fusion occurs within the same instruction bundle (e.g., within the same clock cycle), the instruction stream modification can be performed in the next clock cycle.

FIG. 3 is a block diagram illustrating an example population of the FLTT 200 by a first instruction bundle 300. Instruction bundle 300 includes a load instruction (movd in this example), which is tracked in the FLTT as a candidate for load fusion. The add instruction (add r15, r16) of instruction bundle 300 is shown for example context.

As shown in FIG. 3, this candidate load instruction is tracked in an entry in the FLTT. V field 204 is set to indicate valid (with a 1 in this example), and age field 206 is initialized to 0. In this example, age field 206 is a single bit, and saturates at a value of 1. LR1 field 210 is set to indicate logical register r15, which is the load destination of the load instruction, and PR1 field 214 is set to indicate the physical register (p56) to which r15 has been renamed. Load source field 216 is set to indicate the load source of the load (rdx, rax, 8 in this example).

When the next instruction bundle passes through the pipeline stage, if a load is detected, the load source is checked against all load source fields within the FLTT. If no address that is within the correct range is found, then a new entry can be created. However, if an address within the correct range is found within the FLTT, the load is tracked and fused using the same FLTT entry, and setting the F bit to one.

FIG. 4 is a block diagram illustrating an example population of the FLTT 200 by a second instruction bundle 400. Instruction bundle 400 includes a load instruction (movd in this example), which is tracked in the FLTT as a candidate for load fusion. The movd load instruction accesses a contiguous address relative to the FLTT entry, and accordingly, is also tracked using the same FLTT entry.

As shown in FIG. 4, LR2 field 212 is set to indicate logical register r17, which is the load destination of the load instruction (movd) in instruction bundle 500. Since a load accessing a contiguous address relative to the FLTT entry has been detected, the loads are fused, and F field 208 is set to 1. Instruction bundle 400 arrives a period of time (e.g., one cycle, or several cycles, e.g., within the window dictated by age field 206) after instruction bundle 300, and accordingly, age field 206 has incremented to 1, which is saturated in this example. However, since F field 208 indicates that the load is fused, V field 204 continues to indicate that the entry is valid. In some implementations, the size (e.g., range or saturation value) of the age counter dictates how large of a time window exists for fusing loads, i.e., how many instructions bundles apart the load fusion candidate instructions can be).

Since a load fusion is now indicated by the FLTT entry, the load from bundle 300, which is in the next stage of the pipeline, is modified to accommodate the size of both load instructions. In this example, since the load from bundle 300 is a scalar double-word load (movd), it is changed to a scalar quad-word load (movq).

The load from bundle 400 is changed to a null operation (nop) instruction (or in some implementations, is simply eliminated), and a move and shift (e.g., as discussed with respect to Table 3) are injected into the instruction stream. In this example, mov r15, r17 and shr r17, 32 are injected into the instruction stream after the nop. In some implementations, this has the advantage of retaining the register dependencies across instruction bundles 300 and 400. The subtract instruction (sub r17, r18) of instruction bundle 400 is shown for example context.

In some implementations, the instruction stream is not modified, and instead, the load fusion occurs within the backend of the processor pipeline (e.g., beyond the dispatch stage; for example, in some implementations, load instructions are fused in the execution (EX) stage and/or the load queue (LQ) stage). In some implementations, it is indicated to the LQ that an amount of data (e.g., 64 bits or 512 bits, where the amount of data loaded would be indicated by the size of the new load and is not limited to the maximum register size (e.g., two 16b loads are fusible into one 32b load in some implementations) will be loaded into one LQ entry, and the register state is modified to the correct values. Such implementations can be referred to as reflecting a transparent microarchitectural approach, or as including implicit load fusion.

Since implicit load fusion approaches may not include modifications to the instruction stream to represent a single destination register for the fused load, in some implementations, the FLTT is modified (or otherwise differs from the implementations which alter the instruction stream) to preserve register dependencies.

Figure 5:
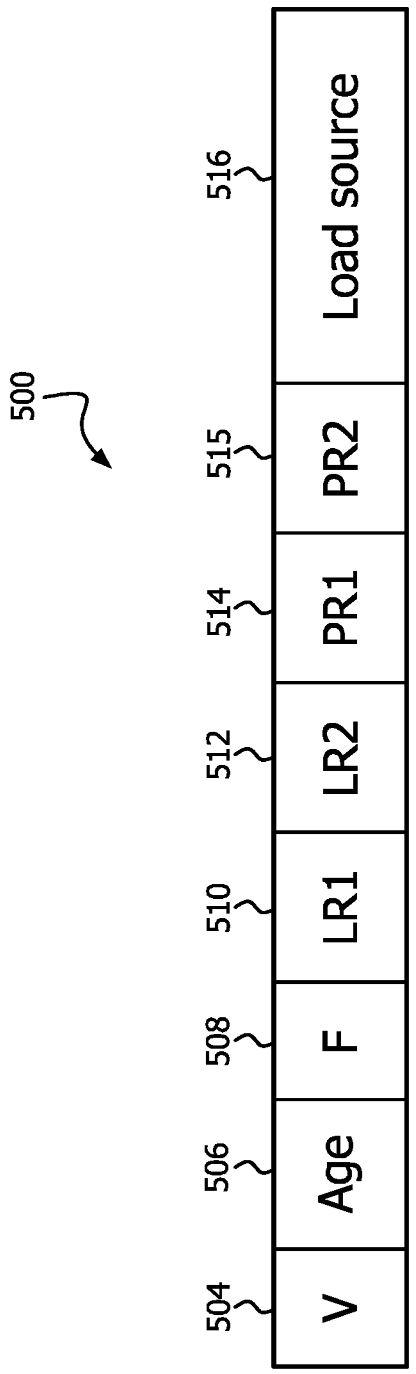
FIG. 5 is a block diagram illustrating an example format for a FLTT entry which may be implemented by hardware as shown and described with respect to FIG. 1.

FIG. 5 is a block diagram illustrating an example format for a fused load tracking table (FLTT) entry 500, for an implicit load fusion mechanism. Entry 500 supports fusing a maximum of two loads, and includes entry identity (ID) field 602, valid (V) field 504, age field 506, fused (F) field 508, logical register 1 (LR1) field 510, logical register 2 (LR2) field 512, physical register 1 (PR1) field 514, physical register 2 (PR2) field 515, and load source field 516.

A difference between the FLTT entry for the implicit and explicit load fusion mechanisms is the second physical register field (PR2 field 515). In some implementations of implicit load fusion, for each load that can be fused, there is one corresponding PR field in the FLTT entry. The example of FIG. 5 illustrates a 2:1 load fusion (i.e., fusing two load instructions into one load instruction), requiring two LR and two PR fields. In other implementations, finer granularity fusions would increase the number of fields. For example, in an 8:1 fusion (e.g., fusing 8 8b load instructions), some implementations include 8 LR and 8 PR fields in the FLTT entry.

Implicit load fusion approaches do not alter the instruction stream as in explicit, instruction modification approaches. Accordingly, instead of dynamically converting instructions within the stream, the implicit mechanism allows both original loads to execute and have their addresses computed, e.g., by address generation units (AGUs). After the address generation is completed, in some implementations, the second load will not allocate a load queue (LQ) entry, but rather, will utilize the same LQ entry as the first load of the fused load. In some implementations, this is done by checking the PR fields of the FLTT to confirm that the physical registers of the load instructions correspond to the correct LQ entry.

Figure 6:
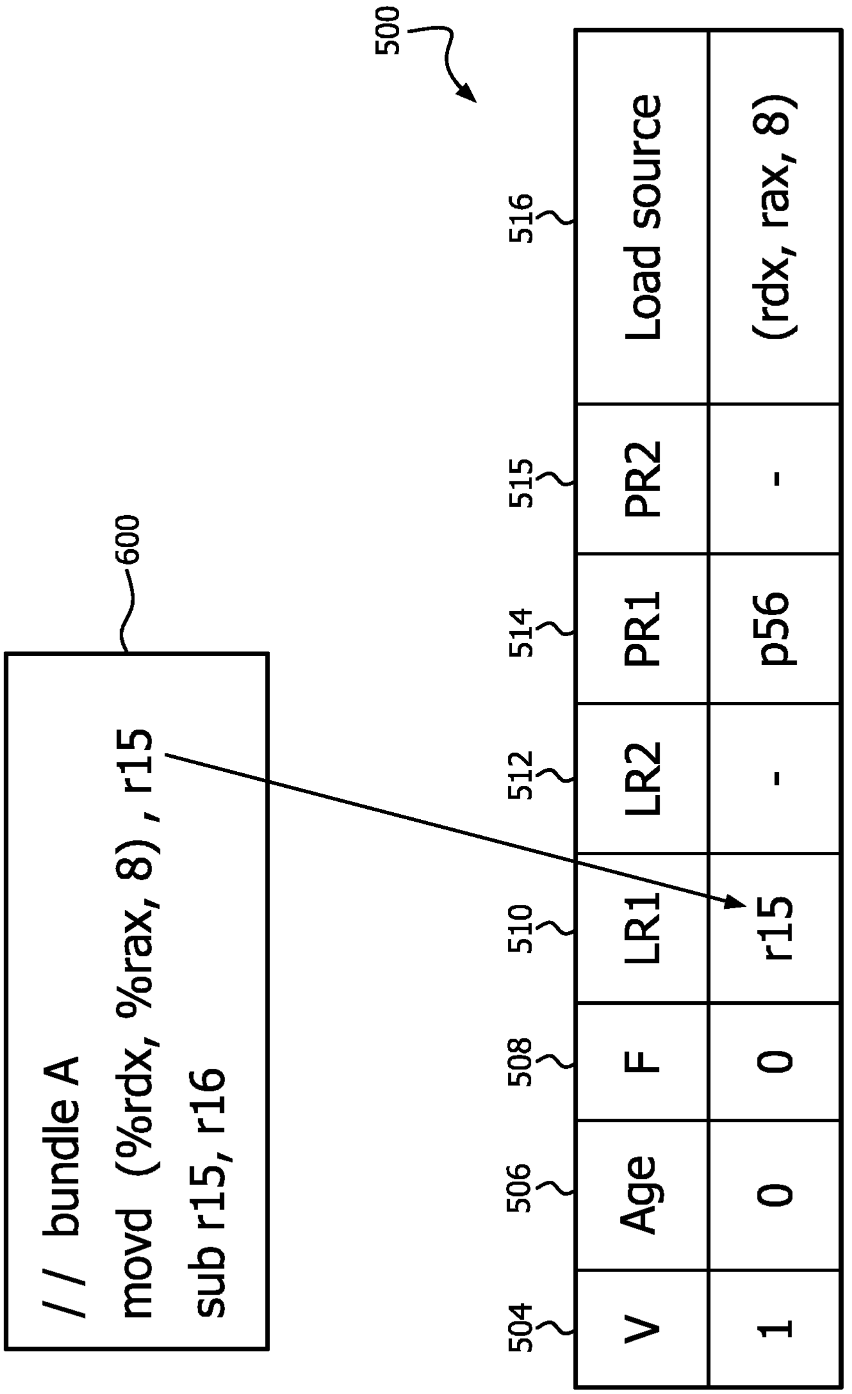
FIG. 6 is a block diagram illustrating an example population of the FLTT shown and described with respect to FIG. 5, by a first instruction bundle.
Figure 7:
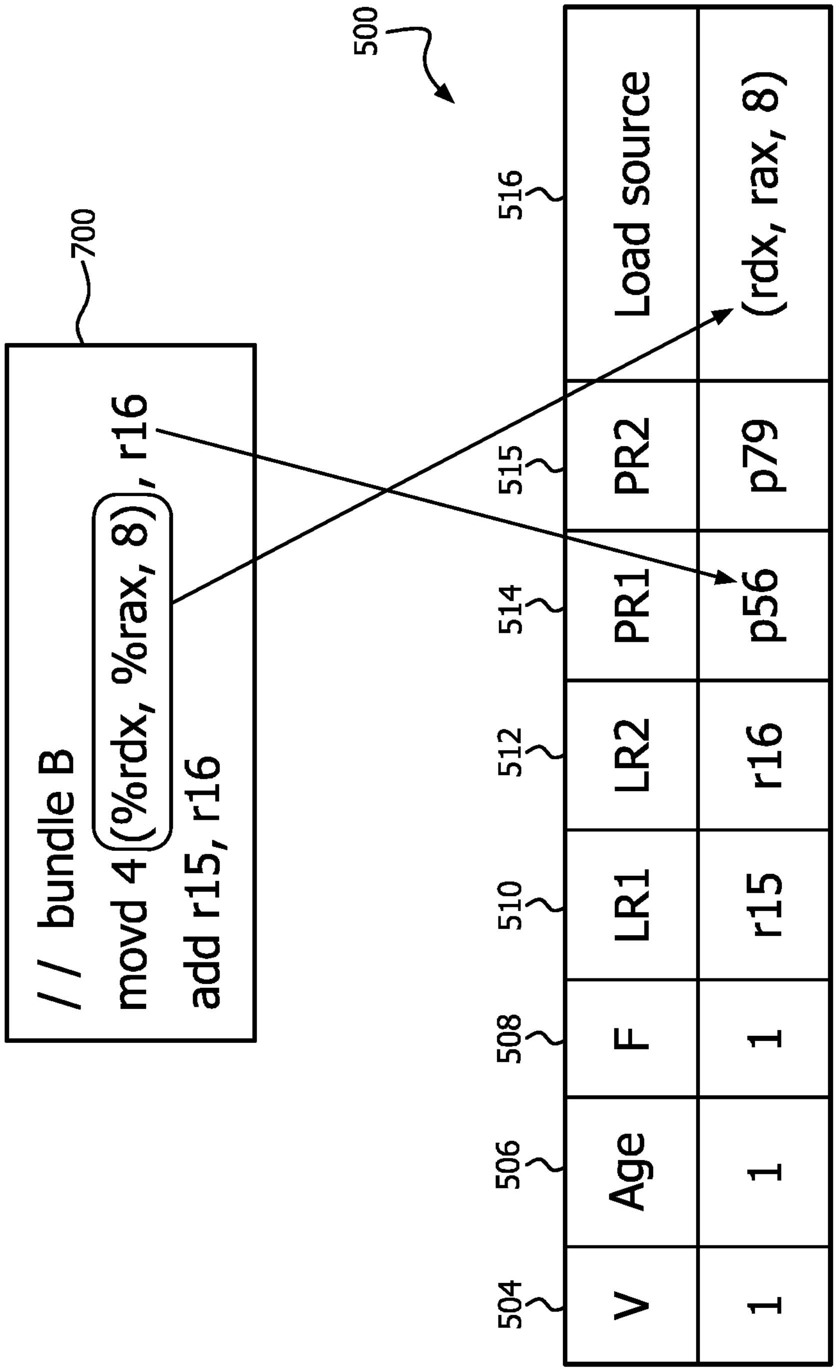
FIG. 7 is a block diagram illustrating an example population of the FLTT shown and described with respect to FIG. 5, by a second instruction bundle.

FIGS. 6 and 7 illustrate population of the an FLTT entry, in an implicit load fusion mechanism, across two decode bundles.

FIG. 6 is a block diagram illustrating an example population of the FLTT 500 by a first instruction bundle 600. Instruction bundle 600 includes a load instruction (movd in this example), which is tracked in the FLTT as a candidate for load fusion. The subtract instruction (sub r15, r16) of instruction bundle 600 is shown for example context. Similar to the explicit load fusion mechanism shown and described with respect to FIG. 3, the PR1 and LR1 field of the FLTT entry are populated with the physical and logical registers of the corresponding load and the valid bit of the field is set.

In the example shown in FIG. 6, this candidate load instruction is tracked in an entry in the FLTT. V field 504 is set to indicate valid (with a 1 in this example), and age field 506 is initialized to 0. In this example, age field 506 is a single bit, and saturates at a value of 1. LR1 field 510 is set to indicate logical register r15, which is the load destination of the load instruction, and PR1 field 514 is set to indicate the physical register (p56) to which r15 has been renamed. Load source field 516 is set to indicate the load source of the load (rdx, rax, 8 in this example).

When the next instruction bundle passes through the pipeline stage, if a load is detected, the load source is checked against all load source fields within the FLTT. If no address that is within the correct range is found, then a new entry can be created. However, if an address within the correct range is found within the FLTT, the load is tracked and fused using the same FLTT entry, and setting the F bit to one.

FIG. 7 is a block diagram illustrating an example population of the FLTT 500 by a second instruction bundle 700. Instruction bundle 700 includes a load instruction (movd in this example), which is tracked in the FLTT as a candidate for load fusion. The add instruction (add r15, r16) of instruction bundle 700 is shown for example context. The movd load instruction accesses a contiguous address relative to the FLTT entry0, and accordingly, is also tracked using FLTT entry.

As shown in FIG. 7, LR2 field 512 is set to indicate logical register r16, which is the load destination of the load instruction (movd) in instruction bundle 700. PR2 field 515 is set to indicate the physical register (p79) to which r16 has been renamed. Since a load accessing a contiguous address relative to the FLTT entry has been detected, the loads are fused, and F field 508 is set to 1. Instruction bundle 700 arrives a period of time (e.g., one cycle, or several cycles, e.g., within the window dictated by age field 506) after instruction bundle 600, and accordingly, age field 506 has incremented to 1, which is saturated in this example. However, since F field 508 indicates that the load is fused, V field 504 continues to indicate that the entry is valid. In some implementations, the size (e.g., range or saturation value) of the age counter dictates how large of a time window exists for fusing loads, i.e., how many instructions bundles apart the load fusion candidate instructions can be).

At this point, the FLTT entry shown in FIG. 7 indicates a fused load, however, unlike the example of FIGS. 2-4, the instruction stream is not modified. Rather, the load fusion now indicated by the FLTT entry is implicit in the architectural flow.

Figure 8:
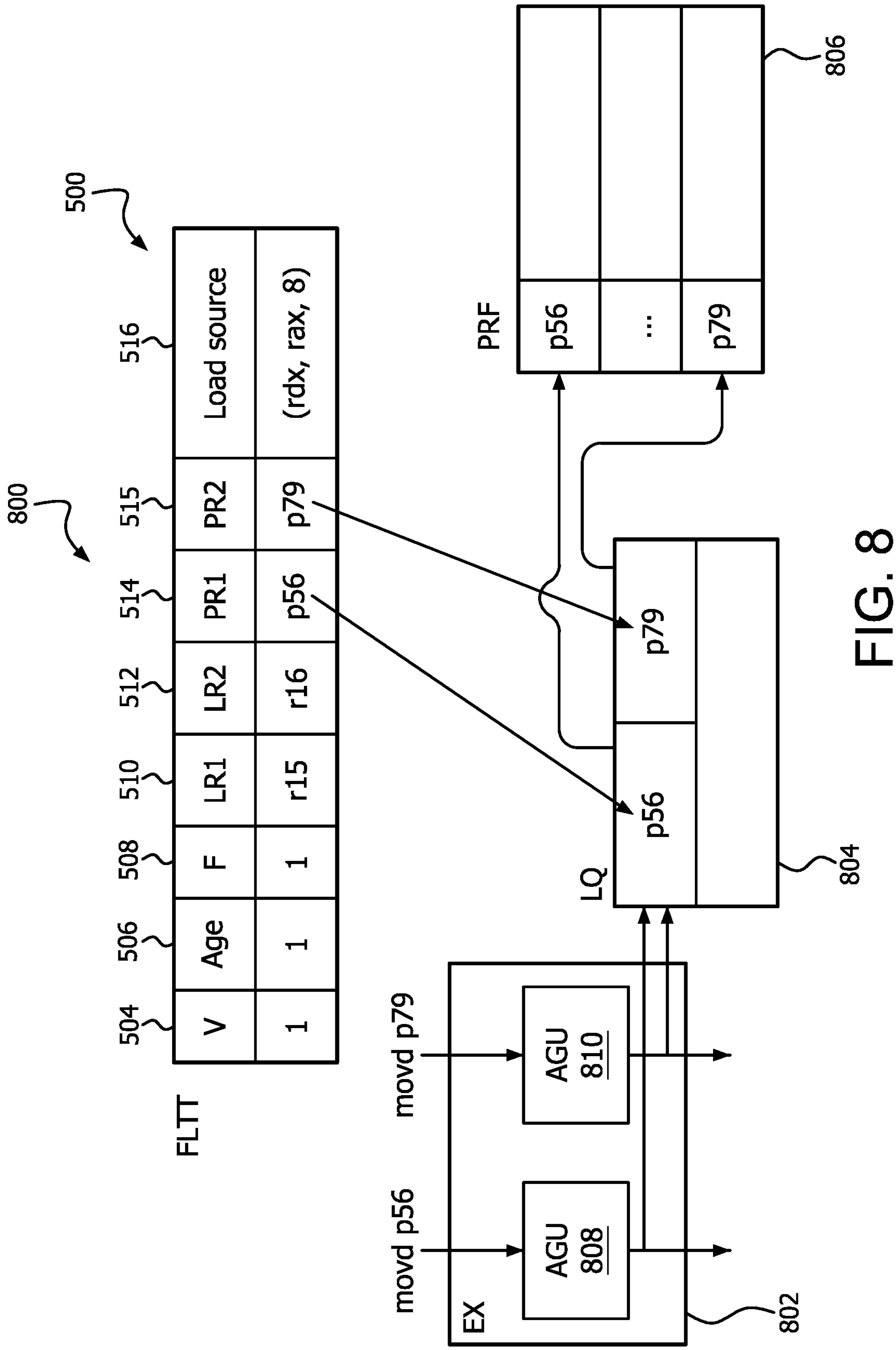
FIG. 8 is a block diagram illustrating example hardware for implementing the implicit load fusion described with respect to FIGS. 5-7.

FIG. 8 is a block diagram illustrating example hardware 800 for implementing the implicit load fusion described with respect to FIGS. 5-7. Hardware 800 includes an FLTT including FLTT entry 500, execution unit (EX) 802, LQ 804, and physical register file (PRF) 806. EX 802 includes AGU 808 and AGU 810.

As shown in FIG. 8, both original load instructions (movd p56, from instruction bundle 600 and movd p79, from instruction bundle 700) execute and their addresses are computed. In this example, the addresses are computed by address generation units (AGUs) 808 and 810, respectively. It is noted that in other examples, the addresses can be computed by the same AGU. For example, in cases where the first address computation occurs in one cycle and the second address computation occurs in the next cycle, the first and second address computations can be computed by the same AGU.

After the address generation is completed, in some implementations, a LQ entry is filled with data, and in some implementations the FLTT entry 500 is invalidated (e.g., by setting V bit 504 as invalid). In some implementations, the second load will not allocate a separate LQ entry, but rather, will utilize the same LQ entry as the first load of the fused load. This is shown in FIG. 8 where the data destined for the physical addresses output from AGUs 808 and 810 is queued into the same entry of LQ 804, at an offset. In some implementations, this is directed by the implicit load fusion circuitry, e.g., based on the PR1 field 514 and PR2 field 515 of FLTT entry 500. The data is loaded to these destination registers in PRF 806 as shown, e.g., as directed by the implicit load fusion circuitry.

In some implementations, indication of the corresponding sizes of the load (i.e.: 32b, 128b) are moved into the physical registers based on the order of the physical registers set within the FLTT entry. In some implementations, additional hardware (e.g., additional wires from the LQ to the PRF) is implemented to route subsets of the load queue entry to the correct physical register. In some implementations, additional hardware is implemented to route between the LQ entry subsets and the correct physical register. In some implementations, this has the advantage of fetching data from memory based on only one load instruction, allowing for loads to occur faster than if two loads were issued. In some implementations, this also has the advantage of reducing the number of LQ entries occupied with co-located loads, thus allowing more loads to be serviced and greater instruction level parallelism.

Figure 11:
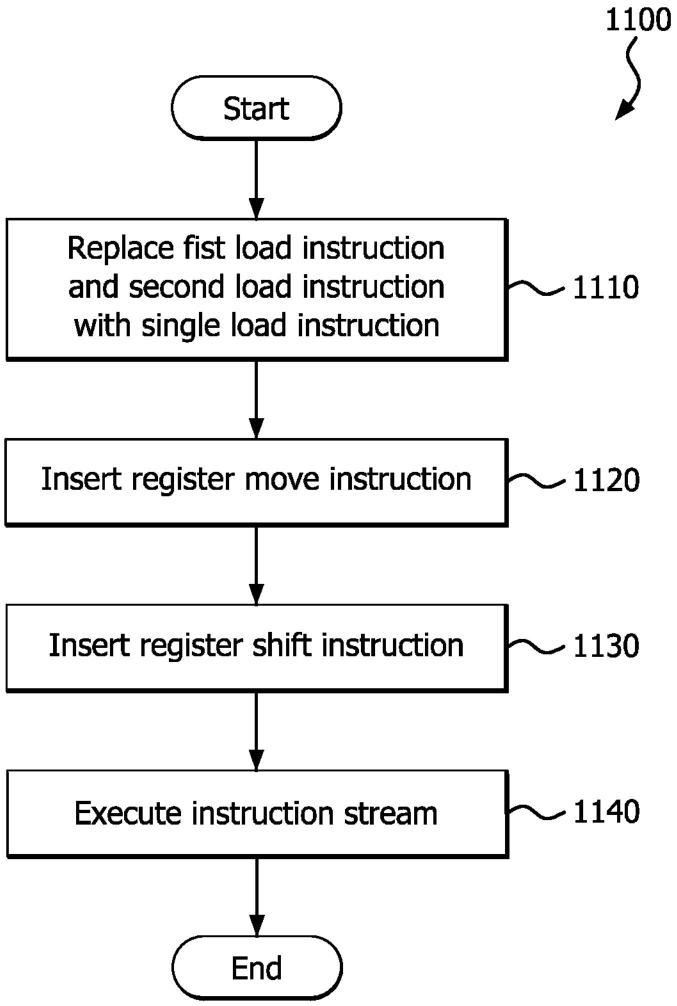
FIG. 11 is a flow chart illustrating an example procedure for explicit operation fusion.

FIG. 11 is a flow chart illustrating an example procedure 1100 for explicit instruction fusion. Procedure 1100 is implementable, for example, using device 100 as shown and described with respect to FIG. 1, and using the techniques shown and described with respect to any of FIGS. 2-10. For example, procedure 1100 is usable to generate the modified instruction stream listed in Table 3 from the original instruction stream listed in Table 3.

In 1110, a first load operation and a second load operation, e.g., of an operation stream, are replaced with a single load operation. In 1120, a register move operation is inserted after the single load operation, e.g., in the operation stream. In 1130, a register shift operation is inserted after the register move instruction, e.g., in the operation stream. In 1140, the operations are executed, e.g., as part of an operation stream.

In some implementations, the stream of operations comprises a stream of instructions, or a stream of pops. In some implementations, the one or more operations configured to move and shift the value stored in the destination register of the single load operation comprises a single operation configured to move and shift the value stored in the destination register of the single load operation. In some implementations, the one or more operations configured to move and shift the value stored in the destination register of the single load operation comprises a first operation configured to move the value stored in the destination register of the single load operation and a second operation configured to shift the value stored in the destination register of the single load operation. In some implementations, a size of a data load indicated by the single load operation is less than, or equal in size to, a sum of a data load indicated the first load operation and of a data load indicated the second load operation. In some implementations, the first load operation loads data of a size smaller than a width of a destination register of the first load operation, and the second load operation loads data of a size smaller than a width of a destination register of the second load operation. In some implementations, replacing the first load operation and the second load operation comprises replacing the first load operation with the single load operation and either replacing the second load operation with a null operation (nop) or eliminating the second load operation. In some implementations, the one or more operations configured to move and shift the value stored in the destination register of the single load operation comprise a register move operation that copies data from a destination register of the first load operation to a second register. In some implementations, the one or more operations configured to move and shift the value stored in the destination register of the single load operation comprise a register shift operation that shifts bits of the second register. In some implementations, the one or more operations configured to move and shift the value stored in the destination register of the single load operation comprise a register shift instruction that shifts bits of the second register by a number of bits which aligns data corresponding to the second load operation.

Figure 12:
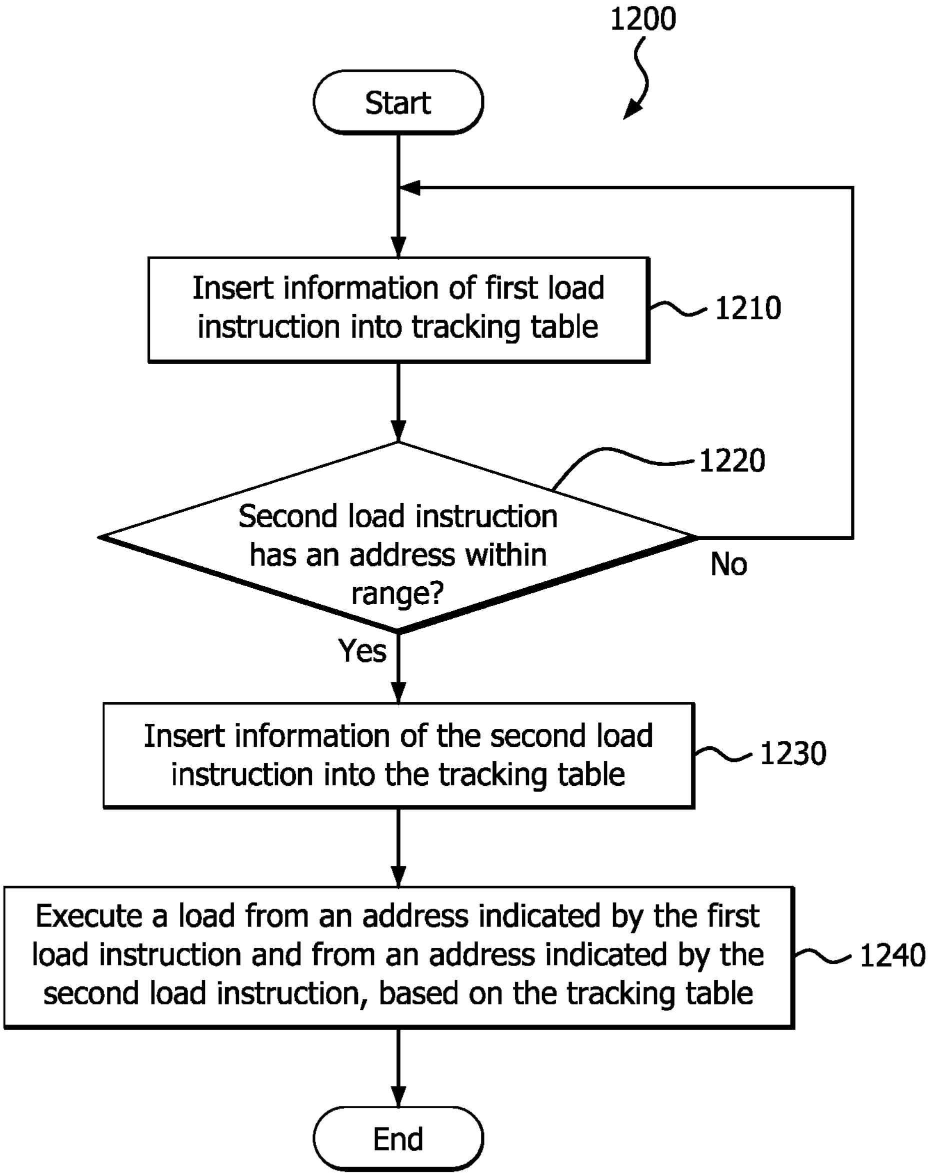
FIG. 12 is a flow chart illustrating an example procedure for implicit operation fusion.

FIG. 12 is a flow chart illustrating an example procedure 1200 for implicit load fusion. Procedure 1200 is usable, for example, using device 100 as shown and described with respect to FIG. 1, and, for example, using the techniques shown and described with respect to any of FIGS. 2-10.

In 1210, information of a first load operation (e.g., a load instruction in a first instruction bundle) is inserted into a tracking table (e.g., an FLTT). On condition 1220 that a second load operation (e.g., of a second instruction bundle) has an address within a range, information of the second load operation is inserted into the tracking table in 1230 and a load from an address indicated by the first load operation and from an address indicated by the second load operation are executed based on the tracking table in 1240, otherwise, the process begins again at 1210. In some implementations the address is within the range if the addresses are consecutive, if the distance or offset between the load addresses is less than or equal to a size of the destination register, or if the addresses are within a desired range, or any other suitable range.)

In some implementations, the first load operation and the second load operation are executed by different address generation units of an EX. In some implementations, the load from the address indicated by the first load operation the load from the address indicated by the second load operation are queued in a same entry of a LQ. In some implementations, the load from the address indicated by the first load operation and the load from the address indicated by the second load operation are queued in a same entry of a LQ, at an offset. Some implementations include circuitry configured to route the load from the address indicated by the first load operation and the load from the address indicated by the second load operation from the LQ to different architectural registers. Some implementations include circuitry configured to route the load from the address indicated by the first load operation and the load from the address indicated by the second load operation from subsets of the entry of the LQ to different architectural registers.

Figure 13:
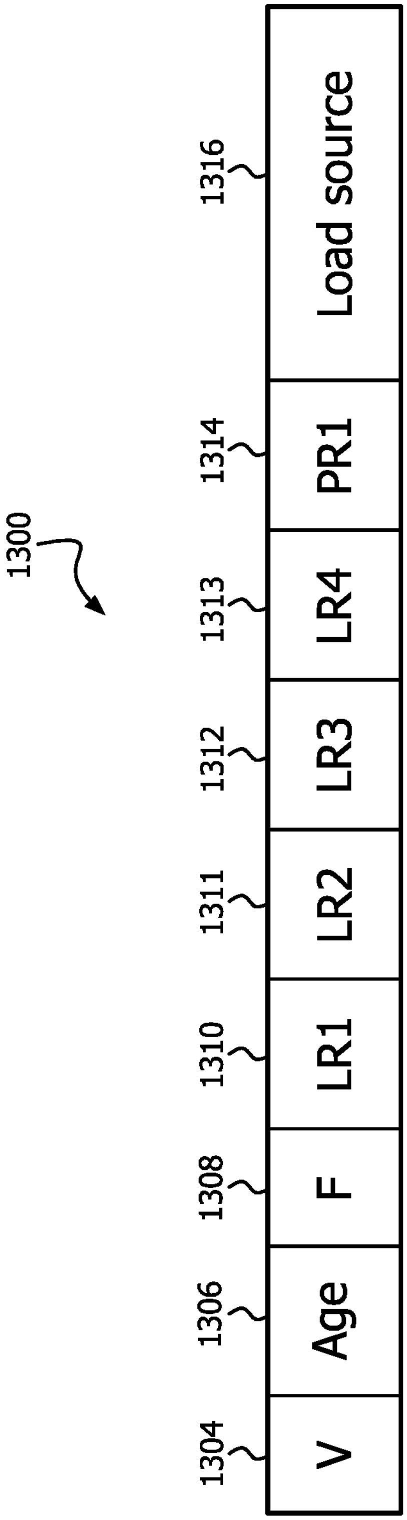
FIG. 13 is a block diagram illustrating an example format for a FLTT entry.

FIG. 13 is a block diagram illustrating an example format for a FLTT entry 1300. Entry 1300 is similar to entry 200 as shown and described with respect to FIG. 2, except that entry 1300 supports fusing a maximum of four loads. Entry 1300 includes valid (V) field 1304, age field 1306, fused (F) field 1308, logical register 1 (LR1) field 1310, logical register 2 (LR2) field 1311, logical register 3 (LR3) field 1312, logical register 4 (LR4) field 1313, physical register 1 (PR1) field 1314, and load source field 1316.

V field 1304 indicates whether entry 1300 is valid, and is set to indicate that entry 1300 is valid when a new entry is created (e.g., when a load operation is detected in the rename stage). The valid bit is set to indicate that entry 1300 is invalid if the fused load has been fetched from memory and marked complete as indicated by a signal from the respective load queue (LQ) entry, or if age field 1306 has saturated (e.g., reached a maximum, or threshold value) and the F field 1308 does not indicate that the load operation has been fused (i.e., indicates that further loads have not been detected to fuse with this load.)

In some implementations, V field 1304 includes a single bit that is set to indicate validity, and cleared to indicate invalidity, however, any suitable implementation of the V field 1304 is usable in other implementations.

Age field 1306 is used to invalidate unfused entries after a period of time (e.g., after a threshold number of cycles), as described above, to allow later loads to be fused instead.

F field 1308 indicates whether the entry represents a fused load. In some implementations, F field 1308 includes a single bit that is set to indicate that the entry represents a fused load, and cleared to indicate that the entry represents a load that is not fused, however, any suitable implementation of the F field 1308 is usable in other implementations.

LR1 field 1310 indicates the logical register to which a candidate load operation stores its loaded information, LR2 field 1311 indicates the logical register to which a second candidate load operation stores its loaded information, LR3 field 1312 indicates the logical register to which a third candidate load operation stores its loaded information, and LR4 field 1313 indicates the logical register to which a fourth candidate load operation stores its loaded information. It is noted that some implementations include additional LR fields (e.g., in order to fuse more than four load operations), or include fewer LR fields (e.g., in order to fuse fewer than four load operations).

PR1 field 1314, indicates the physical register to which the fused load operation, or the first load operation, was renamed in the same decode bundle or past decode bundle, respectively.

Load source field 1316 indicates the register indicating the address, or base address, from which the fused load operation, or the first load operation, loads its information.

In some implementations, the load source field 1316 is used for future loads to check if they are fetching data within a bound of this entry's load (e.g., an 8 byte or 64 byte bound for scalar or vector loads, respectively) allowing the loads to be fused.

It is noted that in some implementations a FLTT entry includes additional fields (e.g., additional LR fields to track further load candidates in order to fuse more than four loads), or includes fewer than, or a subset of these fields (e.g., where the information is tracked in other ways, or is not tracked).

Figure 14:
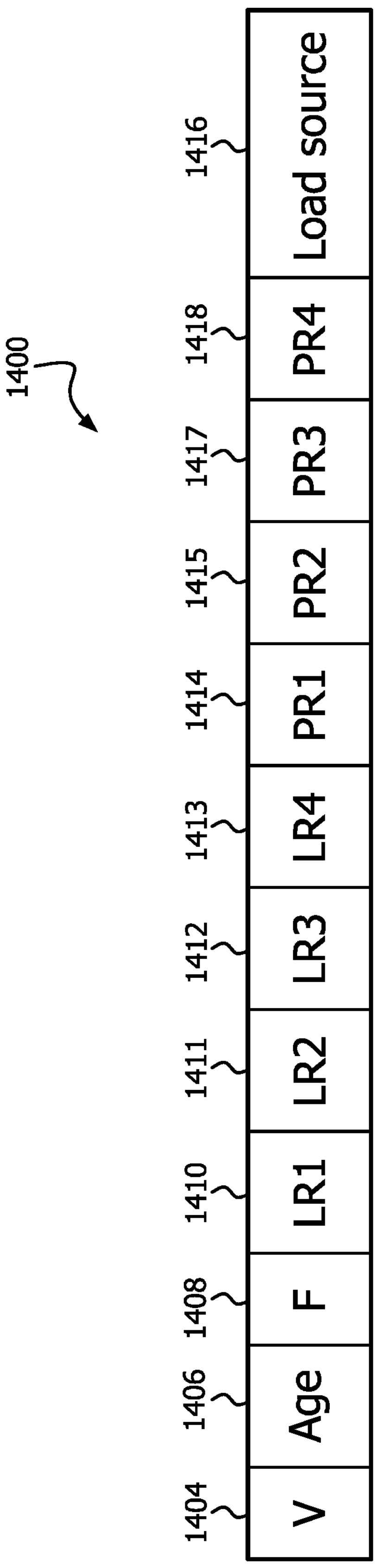
FIG. 14 is a block diagram illustrating an example format for another FLTT entry.

FIG. 14 is a block diagram illustrating an example format for a FLTT entry 1400, for an implicit load fusion mechanism. Entry 1400 is similar to entry 500 as shown and described with respect to FIG. 5, except in that entry 1400 supports fusing a maximum of four loads. Entry 1400 includes entry identity (ID) field 1402, valid (V) field 1404, age field 1406, fused (F) field 1408, logical register 1 (LR1) field 1410, logical register 2 (LR2) field 1411, logical register 3 (LR3) field 1412, logical register 4 (LR4) field 1413, physical register 1 (PR1) field 1414, physical register 2 (PR2) field 1415, physical register 3 (PR3) field 1417, physical register 4 (PR4) field 1418, and load source field 1416.

A difference between the FLTT entry for the implicit and explicit load fusion mechanisms is the second, third, and fourth physical register fields (PR2, PR3, and PR4 fields 1415, 1417, 1418). In some implementations of implicit load fusion, for each load that can be fused, there is one corresponding PR field in the FLTT entry. The example of FIG. 14 illustrates a 4:1 load fusion (i.e., fusing four load operations into one load operation), requiring four LR and four PR fields. In other implementations, finer granularity fusions would increase the number of fields. For example, in an 8:1 fusion (e.g., fusing 8 8b load operations), some implementations include 8 LR and 8 PR fields in the FLTT entry.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) operations and other intermediary data including netlists (such operations capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor configured for load fusion, comprising:
- circuitry configured to replace a first load operation and a second load operation, in a stream of operations, with a single load operation; and
- circuitry configured to insert one or more operations after the single load operation in the stream of operations;
- wherein the one or more operations are configured to move and shift a value stored in a destination register of the single load operation and comprise a register move operation and a register shift operation;
- wherein the register move operation copies data from the destination register of the single load operation to a second register; and
- wherein the register shift operation shifts bits of the second register.

2. The processor of claim 1, wherein the stream of operations comprises a stream of instructions, or a stream of micro-operations (uops).

3. The processor of claim 1, wherein the one or more operations configured to move and shift the value stored in the destination register of the single load operation comprises a single operation configured to move and shift the value stored in the destination register of the single load operation.

4. The processor of claim 1, wherein the one or more operations configured to move and shift the value stored in the destination register of the single load operation comprises a first operation configured to move the value stored in the destination register of the single load operation and a second operation configured to shift the value stored in the destination register of the single load operation.

5. The processor of claim 1, wherein a size of a data load indicated by the single load operation is less than, or equal in size to, a sum of a data load indicated the first load operation and of a data load indicated the second load operation.

6. The processor of claim 1, wherein the first load operation loads data of a size smaller than a width of a destination register of the first load operation, and the second load operation loads data of a size smaller than a width of a destination register of the second load operation.

7. The processor of claim 1, wherein replacing the first load operation and the second load operation comprises replacing the first load operation with the single load operation and either replacing the second load operation with a null operation (nop) or eliminating the second load operation.

8. The processor of claim 1, wherein the register shift operation that shifts bits of the second register by a number of bits which aligns data corresponding to the second load operation.

9. A method for load fusion, the method comprising:
replacing a first load operation and a second load operation, in a stream of operations, with a single load operation; and
inserting one or more operations after the single load operation in the stream of operations;
wherein the one or more operations are configured to move and shift a value stored in a destination register of the single load operation and comprise a register move operation and a register shift operation;
wherein the register move operation copies data from a destination register of the first load operation to a second register; and
wherein the register shift operation shifts bits of the second register.

10. The method of claim 9, wherein the stream of operations comprises a stream of instructions, or a stream of micro-operations (pops).

11. The method of claim 9, wherein the one or more operations configured to move and shift the value stored in the destination register of the single load operation comprises a single operation configured to move and shift the value stored in the destination register of the single load operation.

12. The method of claim 9, wherein the one or more operations configured to move and shift the value stored in the destination register of the single load operation comprises a first operation configured to move the value stored in the destination register of the single load operation and a second operation configured to shift the value stored in the destination register of the single load operation.

13. The method of claim 9, wherein a size of a data load indicated by the single load operation is less than, or equal in size to, a sum of a data load indicated the first load operation and of a data load indicated the second load operation.

14. The method of claim 9, wherein the first load operation loads data of a size smaller than a width of a destination register of the first load operation, and the second load operation loads data of a size smaller than a width of a destination register of the second load operation.

15. The method of claim 9, wherein replacing the first load operation and the second load operation comprises replacing the first load operation with the single load operation and either replacing the second load operation with a null operation (nop) or eliminating the second load operation.

16. A processor configured for load fusion, comprising:
circuitry configured to insert information of a first load operation into a tracking table;
circuitry configured to insert information of a second load operation into the tracking table responsive to an address of the second load operation being within a range; and
circuitry configured to execute a load operation from an address indicated by the first load operation and from an address indicated by the second load operation based on the tracking table.

* * * * *